No. 712,429. Patented Oct. 28, 1902.
L. WILHELM.
FRAMELESS SPECTACLES OR EYEGLASSES.
(Application filed Dec. 27, 1901.)
(No Model.)
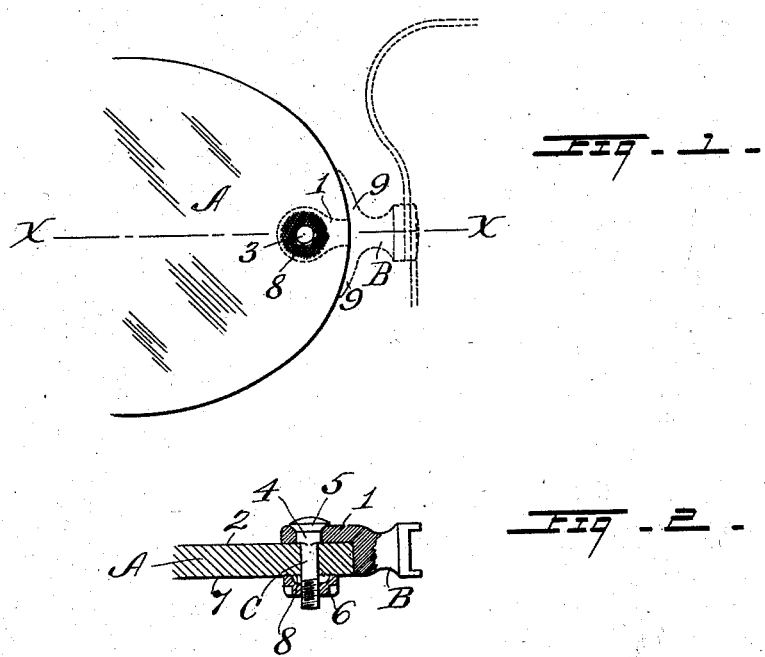
Witnesses
D. M. Stewart
Louis Wilhelm
Inventor
by
Attorney

UNITED STATES PATENT OFFICE.

LOUIS WILHELM, OF SOUTHBRIDGE, MASSACHUSETTS, ASSIGNOR TO WILLIAM W. ESSICK, OF READING, PENNSYLVANIA.

FRAMELESS SPECTACLES OR EYEGLASSES.

SPECIFICATION forming part of Letters Patent No. 712,429, dated October 28, 1902.

Application filed December 27, 1901. Serial No. 87,474. (No model.)

*To all whom it may concern:*

Be it known that I, LOUIS WILHELM, a citizen of the United States, residing in Southbridge, county of Worcester, State of Massachusetts, have invented certain new and useful Improvements in Frameless Spectacles or Eyeglasses, of which the following is a specification.

My invention relates to frameless spectacles or eyeglasses, and more particularly to that class in which a single ear-fitting is employed, contacting with one face of the lens only and secured thereto by means of a clamping-screw. Owing to the constantly-recurring strains apt to be brought upon this screw connection in reverse directions by the handling of the spectacles or eyeglasses it is well known that the tendency and general effect are to gradually loosen it and finally render the same useless or unsatisfactory.

The object of my invention is to prevent this loosening effect notwithstanding these strains and the slight relative movements of the connected parts which result therefrom. To this end I provide for maintaining one of the screw-threaded parts in fixed relation to the lens when the connection is made and the other in fixed relation to the fitting, so that any slight turning of the latter relative to the lens while theoretically reducing the clamping tension will have even this inconsequential effect only temporarily, the reverse movement which follows it restoring the parts to their original position and tension and there being no cumulative loosening effect, as there ordinarily is.

The invention is fully described in connection with the accompanying drawings and is particularly pointed out in the claims.

Figure 1 is an elevation showing a portion of an eyeglass-lens with the fitting indicated in position, but not clamped to the lens. Fig. 2 is a cross-sectional view taken on the line $x\ x$ of Fig. 1 and showing the clamping-screw in position.

A represents the lens of a frameless eyeglass, and B a nose-fitting having a single clamping-ear 1 in contact with one face 2 of the lens and clamped against said face by means of a clamping-screw C, which passes through a perforation 3 in the lens. This screw is provided, as shown, with a rectangular body portion 4 adjacent to its head 5, which is non-rotatably seated in a correspondingly-shaped opening in the ear 1. The main body of the screw which passes through the perforation 3 is screw-threaded at its outer end and provided with a nut 6, arranged to seat against the opposite face 7 of the lens.

My invention relates to preventing the loosening of the clamping connection between the lens and the fitting, as already explained, and I accomplish this, as shown, by merely providing a roughened surface 8 on one face 7 of the lens, around the perforation 3, to serve as a seat for the nut 6, which will practically engage the latter when it is drawn up tightly against it in clamping the parts together, so as to cause it to adhere to the lens when a turning movement is imparted to the bolt C by the frequent slight rocking movements of the fitting B, which movements are limited but not entirely prevented by the use of the usual guards 9 on the fitting adapted to bear against the edge of the lens. By this means the rocking movements of the fitting B have practically no loosening effect upon the clamping connection, the nut being prevented from backing off by its adhesion to the roughened lens-surface 8.

It will be noticed that this simple improvement in construction not only avoids the accidental loosening of the connection without requiring any locking operation—such, for instance, as slightly riveting the projecting end of the screw—but at the same time permits of convenient taking apart and putting together again without impairing any part of the structure.

What I claim is—

1. In frameless spectacles or eyeglasses the combination of a perforated lens, a single ear-fitting thereto, a clamping-bolt and nut, and means for maintaining one of the tightened-up screw-threaded parts in frictionally-fixed relation, rotatively, to the lens, so as to normally turn therewith in either direction and the other of said parts in fixed relation rotatively to the fitting substantially as set forth.

2. In frameless spectacles or eyeglasses, the combination of a lens having a perforation and a portion of one face thereof around said perforation roughened or abraded, a fitting having a single clamping-ear in contact with the opposite face of the lens, a clamping-screw in non-rotatable engagement with said ear and passing through said perforation, and a nut on said screw firmly seated against said roughened or abraded face of the lens, and adapted by frictional engagement to normally turn therewith upon the screw substantially as set forth.

In testimony whereof I affix my signature in the presence of two witnesses.

LOUIS WILHELM.

Witnesses:
FRANK D. FOLEY,
MABEL S. FOLEY.